United States Patent [19]

Galstaun

[11] Patent Number: 4,552,572

[45] Date of Patent: Nov. 12, 1985

[54] PROCESS FOR DESULFURIZATION OF FUEL GAS

[75] Inventor: Lionel S. Galstaun, Houston, Tex.

[73] Assignee: Bechtel International Corporation, San Francisco, Calif.

[21] Appl. No.: 517,885

[22] Filed: Jul. 26, 1983

[51] Int. Cl.[4] .............................................. B01D 47/00
[52] U.S. Cl. ........................................ 55/36; 55/48; 55/73; 55/68; 55/43; 55/53
[58] Field of Search ................... 55/37, 36, 38, 40, 42, 55/46, 47, 48, 49, 53, 55, 56, 68, 73, 43; 423/220, 210, 246, 228, 229

[56] References Cited

U.S. PATENT DOCUMENTS

| | | | |
|---|---|---|---|
| 3,245,752 | 4/1966 | Fryar et al. | 423/229 |
| 3,664,091 | 5/1972 | Hegwer | 55/73 |
| 3,824,766 | 7/1974 | Valentine et al. | 55/48 |
| 4,050,909 | 9/1977 | Ranke | 55/48 |
| 4,080,424 | 3/1978 | Miller et al. | 55/73 |
| 4,332,598 | 6/1982 | Antanos et al. | 55/73 |
| 4,430,316 | 2/1984 | Ranke et al. | 55/68 |

FOREIGN PATENT DOCUMENTS

| | | | |
|---|---|---|---|
| 2759123 | 7/1979 | Fed. Rep. of Germany | 55/73 |
| 2088240 | 6/1982 | United Kingdom | 55/55 |

*Primary Examiner*—Bernard Nozick
*Attorney, Agent, or Firm*—Townsend and Townsend

[57] ABSTRACT

Apparatus and a method for removal of acid gases from a first gas rich in carbon dioxide and for desulfurizing a second gas lean in carbon dioxide but containing sulfur compounds as impurities. The method includes contacting the first gas with a solvent capable of extracting carbon dioxide and sulfur compounds from the first gas. Then, the solvent containing carbon dioxide is separated from the solvent containing sulfur compounds. The second gas is then contacted with said solvent containing carbon dioxide under conditions sufficient to cause said solvent containing carbon dioxide to extract sulfur compounds from said second gas and to release carbon dioxide. The desulfurized second gas is thereafter separated from the solvent containing sulfur compounds from the second gas.

15 Claims, 1 Drawing Figure

4,552,572

PROCESS FOR DESULFURIZATION OF FUEL GAS

BACKGROUND OF THE INVENTION

The generation of electric power from fossil fuel is receiving careful scrutiny with respect to its impact on the environment. The impact can be measured in terms of heat and pollutant emissions to the biosphere. Emission of waste heat is an unavoidable result of thermodynamics, but the specific quantity of heat emitted per kilowatt of electricity generated can be minimized by improvement of the thermal efficiency of the power generating cycle. Pollutant emissions can be minimized preferably by treatment of the fuels prior to combustion, although post combustion treatment is also technically and, sometimes, economically feasible.

While coal, and particularly high-sulfur, high-ash coal, is considered to be a source of potentially high pollution, improved technology to convert coal to desulfurized, ash-free gas is one feasible means of avoiding deleterious emissions. The technology is continuing to be developed. The processes used for this process are designed to extract the sulfur from the raw gas and to recover the sulfur compounds as elemental sulfur. The ash is recovered as cinders or granulated slag, leaving only a clean gas that is benign in environmental impact for use as fuel.

Gasification of coal normally produces a raw gas which comprises largely carbon monoxide and hydrogen, admixed with lesser quantities of carbon dioxide and methane. In addition, gaseous sulfur compounds, notably $H_2S$ and COS, together with ammonia, elemental nitrogen, hydrogen cyanide and argon will be found at relatively low concentrations. Removal of the sulfur compounds, ammonia and cyanide can be accomplished economically, thus preventing the emission of sulfur compounds and reducing nitrogen oxides in the combusted gas.

Thermal efficiency of the power generation cycle can be significantly increased by combining the gas combustion turbine as a "topping" cycle with a "bottoming" steam turbine. The steam turbine may be either totally condensing, partially condensing, or non-condensing depending on the capability of the overall system to utilize low-pressure steam.

Whereas an installation where electric power is the sole product will have relatively minor uses for extraction steam, a multi-product plant can find many uses for steam at pressures of 200 psig or even lower. Typical uses for low pressure steam are found in chemical plants and petroleum refineries, where large quantities are used for process heat. Therefore, by joining the combined gas-steam turbine cycle with co-generation of moderate to low pressure steam for process heat, thermal efficiency can be maximized at the hot as well as the cold ends of the cycle with resultant minimum thermal impact on the environment.

Clearly, it would be desirable to locate a chemical plant or a petroleum refinery close or adjacent to a power plant so as to reduce the distance over which steam would need to be transported. But in addition to steam, chemical plants and petroleum refineries can utilize "syngas"—a gas which normally contains carbon monoxide and hydrogen, free from sulfur compounds. Such "syngas" may be utilized directly, or converted to hydrogen by shift conversion of the carbon monoxide and extraction of carbon dioxide.

The combined operation of power generation and chemical plant or petroleum refinery operation provides important opportunities such as:
1. Significantly improved thermal efficiency
2. Improved process economics because of larger scale in the gasification and gas purification plants
3. Improved overall economics from increased efficiency and savings in capital
4. Reduced environmental impact

SUMMARY OF THE INVENTION

The present invention is concerned with an improvement in the process of producing desulfurized gas from the gasification of coal, where at least a significant fraction of the total gas is used for combined cycle power generation and another fraction for conversion to "syngas" or hydrogen. Under these specific conditions, there will be two or more gaseous streams requiring purification to remove carbon dioxide and/or sulfur compounds. Typically, the gas for fuel use will contain relatively low concentrations of carbon dioxide, whereas the gas to be diverted to synthesis will contain a relatively high concentration of carbon dioxide due to the conversion of a part or all of the carbon monoxide to hydrogen and carbon dioxide. This invention is concerned with an advantageous utilization of this difference.

Both carbon dioxide and hydrogen sulfide are acid gases and, therefore, are absorbed non-selectively in alkaline absorbents when the system is designed to approach chemical equilibrium. With physical solvents, such as methanol, N-methyl pyrolidone, the dimethyl either of polypropylene glycol, or compounds of analogous structure, the situation is fundamentally different. In physical solvents, carbon dioxide often shows a significantly lower equilibrium solubility than hydrogen sulfide or carbonyl sulfide. Thus, hydrogen sulfide, while being absorbed, can displace carbon dioxide from a carbon-dioxide-rich physical solvent.

In acid gas absorption systems where a physical solvent is used to remove hydrogen sulfide and carbon dioxide which are present as impurities, the hydrogen sulfide is absorbed first. In installations where the absorption is accomplished in a counter current tower designed to absorb both hydrogen sulfide and carbon dioxide, with impure gas fed at the bottom and lean solution at the top, substantially complete removal of the hydrogen sulfide is typically accomplished in just the bottom part of the column. It follows, therefore, that the solution in contact with gas in the column above the $H_2S$ absorption zone will be free of $H_2S$.

Recalling now the fact that gas prepared for synthesis is richer in carbon dioxide than fuel gas, the principle involved in the present invention is as follows:
1. Provide a physical absorption column for extraction of acid gases from a raw syngas rich in $CO_2$ and containing $H_2S$.
2. Remove a part of the rich solution from the absorption column above the $H_2S$ absorption zone, and return the balance of the rich solution to the column to provide solvent for the removal of $H_2S$.
3. Deliver the $CO_2$-rich solvent from the absorption column to a second absorption column designed to extract $H_2S$ from the $CO_2$-lean fuel gas.

The advantages gained from the proposed mode of operation are as follows:

1. $CO_2$ is stripped from the rich solution by the $CO_2$-lean gas. This $CO_2$ is delivered into fuel gas at pressure, and enhances the potential for power from a gas turbine because of increased mass flow, or by saving power needed to compress excess combustion air needed to hold combusted gas temperature below a maximum limit determined by the materials used in the turbine.
2. Since part of the $CO_2$ is delivered into fuel gas, less is absorbed in the solvent, and therefore less is stripped from the solvent with the $H_2S$. The concentration of $H_2S$ in the acid gas delivered to the sulfur (Claus) plant is increased, thus raising the efficiency of the Claus plant. Simultaneously, regeneration energy demand is reduced in the acid gas extraction plant.
3. Since some of the solvent is used twice, total circulation of solvent is reduced, thus saving pumping power.

PRIOR ART

The following U.S. patents relate to desulfurization of fuel gas:
1. U.S. Pat. No. 3,824,766 issued July 23, 1944 to W. Luley and J. Valentine, assigned to Allied Corp.
2. U.S. Pat. No. 4,332,598 issued June 1, 1982 to R. J. Allam, I. A. Antonas and W. P. Hegarty, assigned to Air Products and Chemicals.

U.S. Pat. No. 3,824,766 describes an "adiabatic" process for purification of hydrocarbon gases containing $CO_2$ and sulfur compounds as impurities. In the process, a $CO_2$-laden physical solvent is used to extract sulfur compounds from the impure gas stream. After removal of the sulfur compounds, the partly purified gas stream is passed to an expansion turbine where work is produced and the gas, which still contains $CO_2$, is chilled, but is now at a pressure that is lower than the impure gas. The chilled gas is contacted with warm, lean solvent. The solvent is thereby cooled and partially saturated with $CO_2$, and the $CO_2$ laden solvent is then pumped to the main absorber to extract sulfur compounds from the impure gas stream.

The process operates without any external coolant, or source of power. All the cooling and pumping energy requirements are provided by the expansion of the gas in the expander. This feature, which is clearly valuable and desirable for utilization in arid areas, also imposes a limitation on the concentration of $CO_2$ and sulfur compounds present in the gas, and may make it inapplicable to gases rich in $CO_2$ and $H_2S$ such as would be obtained by shift conversion of gas from partial oxidation of fuel oil or coal.

Another limitation would result in the expansion ratio that is permissible in the expander. For example, if the treated gas is required at or about the pressure of the feed gas, the process would no longer be "adiabatic".

U.S. Pat. No. 4,332,598 also uses a $CO_2$-laden physical solvent to extract the bulk of the sulfur compounds from an impure gas. The partially purified gas is then contacted with fully regenerated solvent to extract the $CO_2$ and the remaining sulfur compounds, mostly COS. The second absorption produces the $CO_2$-laden solvent, part of which is used for the extraction of the bulk of the sulfur. The remainder is sent to a $CO_2$ stripper where a $CO_2$-rich stream and regenerated solvent are separately recovered. The $CO_2$-rich stream is then fractionated under cryogenic conditions to produce pure $CO_2$ suitable for use in urea synthesis. The rich solvent from the first absorber, containing the bulk of the sulfur compounds is regenerated in a stripper to recover a gaseous concentrate of the sulfur compounds and a lean solution suitable for use in the $CO_2$ absorber. The sulfur compound concentrate may be converted to elemental sulfur in a Claus plant.

The primary object of the present invention is to provide process and apparatus for producing desulfurized gas from the gasification of coal in which a significant fraction of the total gas can be used for combined cycle power generation and another fraction for conversion to "syngas" or hydrogen.

Other objects of this invention will become apparent as the following specification progresses reference being had to the accompanying single figure for a schematic view of the apparatus of the invention.

DETAILED DESCRIPTION OF THE INVENTION

Figure 1:
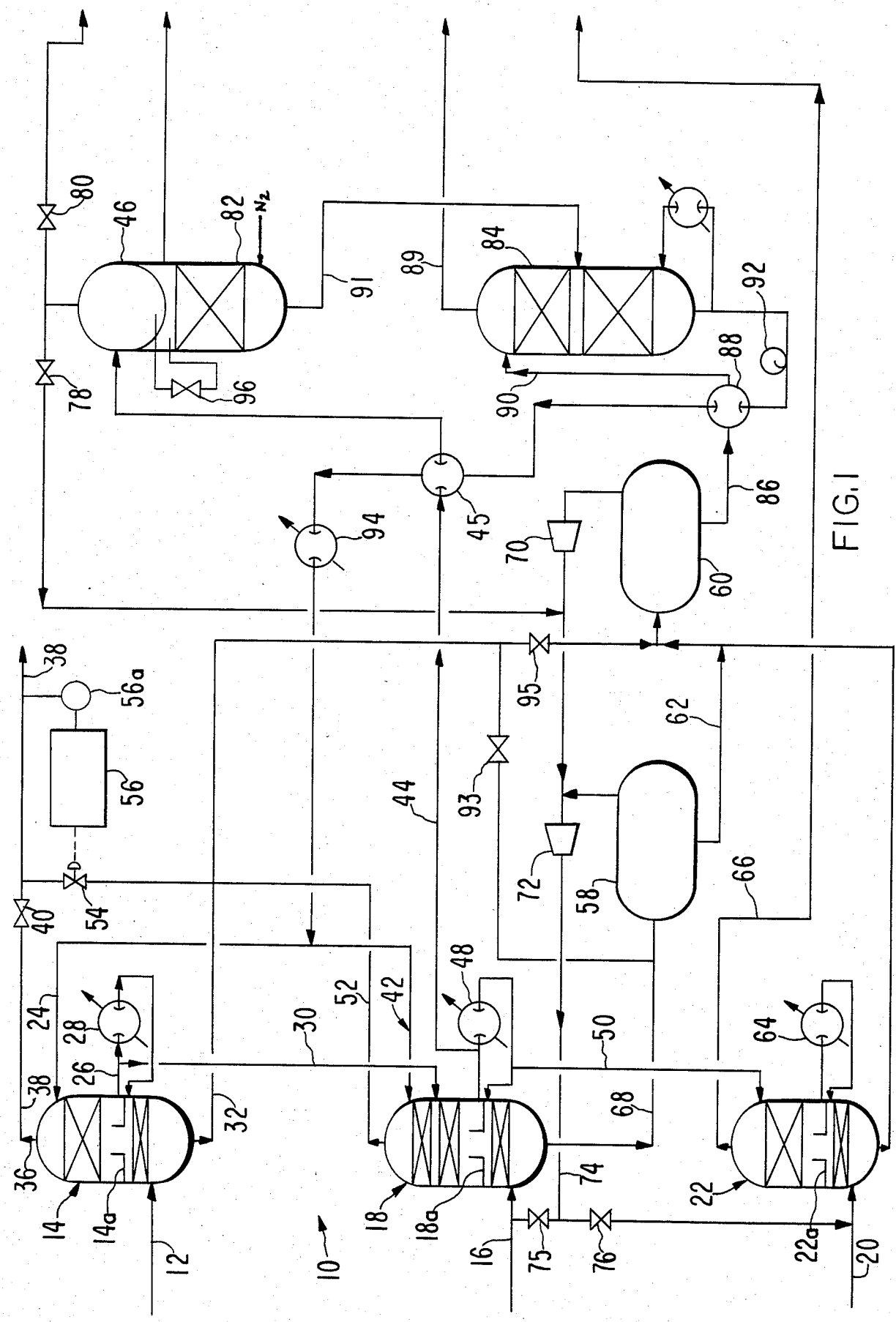

This invention is an improvement on acid gas solvent extraction processes. It is not dependent on any specific solvent, but it does require that the solvent have a preferential selectivity for hydrogen sulfide over carbon dioxide. Thus, methanol, N-methyl pyrolidone, and the dimethyl ether of polyethylene glycol are all suitable since all show a significantly higher equilibrium solubility for hydrogen sulfide than for carbon dioxide. Tertiary ethanolamine solutions in water have a significantly higher rate of absorption for $H_2S$ than for $CO_2$, and this kinetic behavior, can also be used to obtain selective absorption of $H_2S$.

The process of the present invention is advantageously applied to cases where the project requires treatment of raw gases where at least one gas requires only desulfurization, and the other requires extraction of both sulfur compounds and carbon dioxide. Typical of such projects are those where coal or fuel oil gasification is used to generate a fuel gas to power a gas turbine with or without combination with a steam turbine, and a gas which is intended for chemical synthesis. Under such conditions, it is common practice to divide the raw gas intended for synthesis into two portions, one of which is passed to a shift reactor to convert a major portion, typically 75 percent or more, of the carbon monoxide present to hydrogen by the shift reaction:

$$CO + H_2O = CO_2 + H_2$$

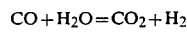

After treatment to remove impurities (including $CO_2$), the shifted gas which is rich in hydrogen, and the unshifted gas which is rich in carbon monoxide may be blended to produce the ratio of hydrogen to carbon monoxide required by the synthesis. Methanol synthesis, for example, calls for a hydrogen to carbon monoxide ratio of 2. Methane requires a ratio of 3. Ammonia requires only hydrogen, which may be blended with purified nitrogen from an outside source to make suitable synthesis gas having a hydrogen to nitrogen ratio of 3.

Where fuel gas is desired as a product, the raw gas needs only to be desulfurized. Carbon dioxide may advantageously be left in the purified gas, and, where the fuel gas is to be used in a gas turbine in either a "stand alone" power cycle or in combination with a steam turbine, enrichment of the turbine fuel with $CO_2$ while extracting sulfur compounds enhances power output and reduces $NO_x$ emissions.

The following approximate compositions are typical of the raw gases derived from coal by high temperature gasification. The two columns illustrate the effect of shift conversion.

TABLE 1

|  | Unshifted Gas | Shifted Gas |
|---|---|---|
| CO, Mol % | 47.0 | 5.4 |
| $H_2$ | 35.5 | 55.7 |
| $CO_2$ | 15.0 | 39.1 |
| $CH_4$ | 0.2 | 0.15 |
| $H_2O$ | 0.2 | 0.15 |
| $H_2S$ | 1.2 | 0.9 |
| COS | 0.1 | (0.02) |
| $N_2$ + Ar | 0.8 | 0.6 |
|  | 100.0 | 100.00 |
| Pressure PSIA | 500–800 | 500–800 |
| Temperature, °F. | 100 | 100 |

Purification of the gases depends on the ultimate use. For example, if the gas is intended for fuel use, an unshifted gas would be used, and removal of sulfur compounds would have to exceed 90 percent or more of the sulfur present. The exact level of desulfurization needed would be dependent on local environmental regulations. For fuel gas, as noted earlier, carbon dioxide does not need to be removed.

For methanol use, shifted and unshifted gases may be blended to obtain a ratio of $H_2$ to CO of 2 and the blend purified. Typically, for "low pressure" methanol synthesis, sulfur levels need to be reduced to less than 1 ppm by volume; and $CO_2$ needs to be reduced to about 5 mol percent in the feed gas to the methanol synthesis.

For hydrogen use, the gas needs to be shifted to the maximum practical extent, and two or more stages of reaction with cooling between stages may be required. Typically, desulfurization will be carried to 1 ppm or less, and $CO_2$ to less than 1 mol percent in preparation for final methanation to convert the remaining carbon oxides to methane. For ammonia, the purification requirements are similar, but the final step may be a liquid nitrogen wash in lieu of methanation. The desired molal ratio of hydrogen to nitrogen of 3 can be adjusted in this step.

If natural gas is the desired product, the $H_2$ to CO ratio needed is 3 as reflected in the stoichiometry of the reaction

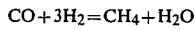
$$CO + 3H_2 = CH_4 + H_2O$$

However, for methane synthesis, an alternate reaction is also provided

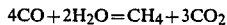
$$4CO + 2H_2O = CH_4 + 3CO_2$$

By properly combining the above reactions in the presence of a suitable catalyst, it is possible to synthesize methane without a separate shift step.

A system illustrating the improved process as applied to treatment of shifted and unshifted gases for preparation of desulfurized, $CO_2$-enriched fuel and chemical synthesis gas free of sulfur and with a low $CO_2$ content is illustrated in FIG. 1 and denoted by the numeral 10.

Referring to FIG. 1, system 10 includes a conduit 12 which delivers cooled gas largely free of particulation having a composition represented approximately by the "Unshifted Gas" column in Table 1, to a first absorber tower, 14. A second conduit 16 delivers gas represented by the "Shifted Gas" analysis in Table 1 to a second absorber tower 18; and a third conduit 20 delivers "Unshifted Gas" to a third absorber tower 22. Absorber towers 14 and 18 are designed to purify gas destined for use in synthesis, whereas tower 22 will be designed to desulfurize fuel gas, and to enrich it with $CO_2$.

Tower 14 is provided, through a conduit 24, with cooled, and in some instances, refrigerated lean absorption solution. As noted previously, the absorption solution may be methanol, in which case it may be chilled to −20° F. or colder; or it may be the dimethyl ether of polyethylene glycol, typically cooled to about 40° F.; or it may be N-methyl pyrolidone, cooled to about 100° F. Finally, it may be an aqueous solution of an alkaline absorbent which shows a significantly higher absorption rate for $H_2S$, such as a tertiary ethanolamine, for example triethanol amine or methyl diethanol amine. The solvent rates are related to the volume and composition of the gas. Given the applicable correlations, the proper solvent rates can be calculated by conventional engineering methods by one skilled in the art. In any event, the present invention is applicable to all of the above solvents, since all provide selective absorption of sulfur compounds.

Solvent delivered to absorber tower 14 through conduit 24 descends in the tower, while making contact with unshifted gas rising in countercurrent flow to the solvent. Carbon dioxide is absorbed by the solvent in the upper portion of the tower. $CO_2$-rich solvent is collected at the "hat tray" 14a and withdrawn from tower 14 as semi-rich solvent substantially free of sulfur compounds through a conduit 26. A part of the semi-rich solvent is cooled in a cooler 28 and returned to tower 14 below the "hat tray" thereof where it again contacts rising gas in counter current flow. In this lower portion of the tower, substantially all of the $H_2S$ and other sulfur compounds are extracted from the gas together with a relatively minor part of the carbon dioxide.

Cooling of the semi-rich solvent is preferable but not necessarily essential; said cooling promotes the solubility of the $H_2S$, and removes heat generated by the absorption of $CO_2$ in the upper portion of the tower.

A portion of the semi-rich solution bypasses the cooler 28 and is delivered to the absorber tower 18 through a conduit 30. This arrangement, which is not essential to the process of the present invention, permits the use of semi-rich solution from absorber tower 14 in absorber tower 18 where it treats gas that is much richer in $CO_2$ than the gas in absorber tower 14.

Rich solution containing substantially all of the sulfur compounds delivered through conduit 12 is removed from absorber tower 14 through a conduit 32 and delivered to a flash tank 60. Treated gas, substantially free of sulfur, and largely free of $CO_2$ exits absorber tower 14 through a conduit 36 and is delivered to a synthesis plant through a conduit 38 at a rate that is regulated by the on-line analyzer 56a and "composition control" computer 56 and by a flow control valve 40 in series with conduits 36 and 38. The flow control rate is set to provide the proper amount of CO-rich purified gas to meet the $H_2$ to CO ratio required by the synthesis unit.

With reference to absorber tower 18, shifted gas corresponding generally to the composition given under the "Shifted Gas" column of Table 1, is delivered to the absorber tower 18 by conduit 16. This gas is rich in hydrogen and carbon dioxide and lean in carbon monoxide. By contrast, the gas treated in absorber tower 14 is relatively lean in carbon dioxide and rich in carbon monoxide. For this reason, the semi-rich solution withdrawn from the $CO_2$ absorbing section of absorber tower 14 has significant remaining capacity for additional $CO_2$ at the high $CO_2$ concentration prevailing in the shifted gas absorber.

To complete the clean-up of $CO_2$, fully regenerated and cooled lean solvent is supplied to the top of the absorber tower 18 through a conduit 42. It may be advantageous in treatment of gas rich in $CO_2$ to provide an additional side cooler (not shown) to remove the heat of absorption of $CO_2$ and enhance its more complete removal. This detail can be evaluated on the basis of specific needs by anyone skilled in the art.

As in absorber tower 14, a "hat tray" 18a is provided to trap out the $CO_2$-rich solution. Part of this stream is sent through a conduit 44 to a $CO_2$ stripper 46. The remainder is cooled in a heat exchanger 48, and of this remainder, a part is returned to the column below the "hat tray" 18a to extract sulfur compounds from the shifted gas. The balance is delivered through a conduit 50 absorber tower 22.

Purified shifted gas, which is mostly hydrogen, is conveyed from absorber tower 18 through a conduit 52 to conduit 36 by way of a regulating valve 54 which controls the quantity of hydrogen required to meet the hydrogen to CO ratio specification of the synthesis gas. The composition of the synthesis gas is determined by the on-line analyzer 56a, and the flow through valve 54 is controlled by a computer system. Purified synthesis gas is delivered to the synthesis plant by way of conduit 38.

Solution rich in $CO_2$ and $H_2S$ is delivered from absorber tower 18 to a flash tank 58 where the pressure is dropped to about one-half of the absolute level prevailing in absorber tower 18. The flashed liquid proceeds then to a flash tank 60 by way of a conduit 62 where the pressure is about one-quarter to one-third of that in absorber tower 18. In case the pressure in absorber tower 18 is very high, for example, 800 to 1000 psi, a third flash tank may be used.

The fuel gas absorber tower 22 operates solely to remove sulfur compounds from the unshifted gas. Noting that the absorption solvent supplied to absorber tower 22 through conduit 50 is saturated with $CO_2$ at a partial pressure several times as high as the partial pressure of $CO_2$ in the unshifted gas fed to absorber tower 22, it is clear that a significant portion of the dissolved $CO_2$ will be stripped from the solvent by the unshifted gas. At the same time, $H_2S$ and other sulfur compounds in the gas will be preferentially absorbed. Absorber tower 22 is also provided with a "hat tray" 22a for potential use with a side cooler 64. In most instances, side cooling will probably be unnecessary because the adiabatic cooling from desorption of the dissolved $CO_2$ should be sufficient to hold temperature at a desired level.

Treated fuel gas, substantially reduced in sulfur content, is delivered from absorber tower 22 fuel gas system by way of a conduit 66.

Rich solvent from absorber tower 22 combines with rich solvent from absorber tower 14 and flashed solvent from flash tower 58 en route to flash tank 60. This completes the description of the absorption portion of the process cycle.

An important feature of the invention encompasses the use of $CO_2$-rich solvent from the $CO_2$ absorption section of an absorber treating $CO_2$-rich gas, and which $CO_2$-rich solvent is substantially free of $H_2S$, to treat a fuel gas stream for the removal of sulfur compounds. Where the fuel gas is to be used in a combustion turbine, this mode of operation has a number of economic and environmental advantages, among which are:

1. A reduced total circulation rate of solvent because at least a part of the solvent is effectively used twice;
2. Increased potential power output from the gas turbine because the $CO_2$ in the gas contributes to mass flow and requires less compression of excess air for control of combusted gas temperature;
3. Reduced potential release of $NO_x$ to the environment because less air is needed for the gas turbine, and thus leading to lower nitrogen content of the combustion gas; and
4. Improved potential recovery of sulfur from the acid gas feed to a Claus plant because of incrementally higher $H_2S$ content of the feed gas to the Claus plant, resulting from diversion of part of the $CO_2$ to the turbine fuel.

The remainder of the process flow is largely conventional for the physical solvent type of acid gas removal plant, but will be described for the sake of completeness.

$CO_2$-rich solvent containing $H_2S$ and other sulfur compounds from shifted gas is conveyed by conduit 68 from the bottom of absorber tower 18 to flash tank 58. Typically, the pressure in flash tank 58 may be about one-half of the pressure, on an absolute basis, of the pressure in the absorber tower 18. This pressure can be optimized, in conjunction with the pressure in the second flash tank 60, to minimize the total power required to compress the flash gases from the two flash tanks for recycling to the absorber. The optimum pressure may be somewhat higher or lower than half of the pressure of the absorber. Alternatively, a third stage of flashing may be justifiable.

The purpose of the flash operation is to release the non-acid gases, notably CO and hydrogen, which are dissolved in the rich solvent, and thus keep them out of the acid gas concentrates. Typically, also, the flash gases will be relatively higher in $CO_2$ to $H_2S$ ratio than the feed gas, and therefore, the flash helps to raise the concentration of $H_2S$ in the acid gas stream sent to the sulfur recovery plant (Claus plant) by forcing part of the $CO_2$ to the $CO_2$ absorption system.

Rich solvent streams from absorber towers 14 and 18 are sent directly to flash tank 60, since these streams are already relatively rich in the $H_2S$, and need only to release the dissolved CO and $H_2$. The flashed gas from flash tank 60 is compressed in the recycle compressor 70 to about the pressure of flash tank 58, and the compressed gas combined with flash gas from flash tank 58, compressed further by compressor 72 and returned to the absorber towers 18 and 22 through conduit 74. The recycle gas may be returned either to absorber towers 18 or 22, or to both in any convenient proportion.

There may be cases where absorber tower 22 is operated at a lower pressure than absorber tower 18, for example when the fuel gas does not need to be at as high a pressure as synthesis gas. In such a case, the flash gas could advantageously be diverted to Absorber 22 and compressor 72 eliminated. At the same time, rich solvent from absorber 14 would flow first to flash tank 58 by appropriate setting of the valves 93, 94, 95 and 96, and then join flashing rich solvent from absorber tower 22 in flash tank 60. Rich solvent flow from absorber tower 18 would continue to flow to flash tank 58.

CO2-rich solvent, free of sulfur compounds, may be available in excess from the "hat-tray 18a" of absorber tower 18. Such a situation may arise in a plant where the volume of fuel gas treated in absorber tower 22 is relatively small, thus requiring only part of the excess available $CO_2$-rich solvent from absorber tower 18. Alternatively a similar situation may arise where the products are hydrogen and fuel gas. In such cases, it is often advantageous to withdraw a portion of the $CO_2$-rich solvent through conduit 44 and send this, after a slight warming in exchanger 76, to flash vessel 46, there to release a nearly pure $CO_2$ gas. This gas may be vented from the system, thus releasing some of the regenerating load on the plant. The $CO_2$ will contain a minor amount of hydrogen as the principal impurity. Carbon monoxide will be present only at trace levels because of its low concentration in the shifted gas.

Flashing of the $CO_2$ from the $CO_2$-rich solvent will result in substantial cooling of the solvent. The cooling reduces the volatility of the solvent, and thus helps to conserve solvent losses.

Flashed gas may, at times, contain $H_2S$ due to maloperation of absorber tower 18. In such cases, by appropriate setting of valves 78 and 80 the flashed gas may be recycled to the absorbers via compressor 72 so as to retain $H_2S$ while the mal-operation persists, thus preventing its release to the environment.

Flashed solvent from flash vessel 46 flows to the top of a $CO_2$-stripper 82. Here, $CO_2$ is largely stripped from the solvent by a counter current stream of gas such as nitrogen.

Stripped solvent from $CO_2$-stripper 82 is fed to an intermediate zone in $H_2S$ stripper 84. System 10 is designed to reduce the $CO_2$ level of treated synthesis gas to a fraction of 1 mol percent. If such a high degree of $CO_2$ removal is not required, a major part of the circulating solvent could be returned to the absorbers from the $CO_2$ stripper. A saving in regeneration heat will result.

Finally, flashed solvent from flash tank 60, containing substantially all of the sulfur compounds in the feed gas, is conveyed via conduit 86 to feed-bottoms exchanger 88 where it is heated by indirect heat exchange against hot, reboiled solvent from the bottom of $H_2S$ stripper 84. The flashed and heated rich solvent then flows to the top of $H_2S$ stripper 84 by conduit 90 where it is fully regenerated by stripping substantially all of the $H_2S$ and $CO_2$ held in solution. The $H_2S$ and $CO_2$, comprising roughly 30 mol percent $H_2S$ and the balance mostly $CO_2$, is sent via conduit to a sulfur plant of the Claus or equivalent type (not shown) where the sulfur is recovered as the elemental material.

The hot, regenerated solvent from the bottom of $H_2S$ stripper 84 is pumped by pump 92 through heat exchangers 88, 76 and a chiller 94 where it is cooled to a temperature appropriate for the specific solvent. This temperature may be as low as $-20°$ to $-40°$ F. for methanol or as high as 100° F. for N-methyl pyrolidone. The lean solvent then is delivered to the absorber towers 14 and 18, thus completing the cycle.

Several variants of this system can be used. For example, it may frequently turn out that fuel gas is needed at a significantly lower pressure than synthesis gas. In such a case, consideration may be given to expanding the fuel gas feed to absorber tower 22 through an expander turbine to cool the gas while reducing pressure. Taking such a step would reduce the overall cooling requirement and thus save operating cost.

System 10 is intended only to illustrate the central features of the invention. Clearly, if methanol were used as a solvent, requiring extraction temperatures in the sub-zero Fahrenheit range, substantial heat exchange between feed and product gases would be economically justified. For simplicity, all such heat exchange has been omitted from FIG. 1, but could be selected and designed by an engineer normally skilled in the art.

I claim:

1. In a system for removal of acid gases from a first gas available at super atmospheric pressure, rich in carbon dioxide and containing hydrogen sulfide, and a second gas rich in carbon monoxide, containing carbon dioxide at a partial pressure lower than in said first gas, and containing hydrogen sulfide, the process comprising the steps of:

contacting the first gas with a physical absorption solvent having a high selectivity for hydrogen sulfide in counter-current flow of solvent and the first gas wherein said solvent absorbs carbon dioxide and hydrogen sulfide in a first stage and said solvent absorbs carbon dioxide but not hydrogen sulfide in a second stage and using part of the solvent from the second stage in the first stage, separating the solvent containing carbon dioxide and hydrogen sulfide from the first stage and recovering a hydrogen rich gas from the second stage;

separately contacting said second gas with another part of the solvent from the second stage under conditions sufficient to cause said solvent containing carbon dioxide to extract hydrogen sulfide from said second gas and to release carbon dioxide; and separating the desulfurized second gas from the solvent containing hydrogen sulfide for use as a fuel.

2. In a system according to claim 1, wherein the solvent is methanol.

3. In a system according to claim 1, wherein the solvent is the dimethyl ether of a polyethylene glycol having 3 to 8 ethylene units.

4. In a system according to claim 1, wherein the solvent is N-methyl pyrolidone.

5. In a system according to claim 1, wherein the pressure of the first gas is above 250 psig, the solvent being in the temperature range of $-20°$ F. to 100° F.

6. In a system according to claim 1, wherein is included the step of regenerating the solvent containing sulfur compounds to recover hydrogen sulfide therefrom.

7. In a system according to claim 1, wherein the step of contacting the first gas with said solvent includes directing the solvent into a first, closed region, the step of contacting the second gas including directing the solvent containing carbon dioxide from said first region into a second, closed region spaced from the first region.

8. In a system according to claim 7, wherein the first gas and the solvent move in countercurrent relationship to each other in said first region.

9. In a system according to claim 7, wherein the second gas and the solvent containing carbon dioxide move in countercurrent relationship to each other in said second region.

10. In a system according to claim 7, wherein the contacting of the first gas includes extracting at least a major part of the hydrogen sulfide from the first gas at a zone in the first region below the zone from which the solvent containing carbon dioxide is removed.

11. In a system according to claim 7, wherein said step of directing the solvent containing carbon dioxide from said first region includes removing a first part of said solvent containing carbon dioxide for flow to the second region, and returning a second part of the solvent containing carbon dioxide to the first region to provide solvent for removal of hydrogen sulfide from the first gas.

12. In a system according to claim 7, wherein is included the step of removing from the first region the portion of the first gas substantially free of sulfur for flow to a third region in the preparation of synthesis gas.

13. In a system according to claim 7, wherein the solvent is methanol.

14. In a system according to claim 7, wherein the solvent is the dimethyl ether of a polyethylene glycol having 3 to 8 ethylene units.

15. In a system according to claim 7, wherein the solvent is N-methyl pyrolidone.

* * * * *